US009275370B2

(12) United States Patent
Xiao et al.

(10) Patent No.: US 9,275,370 B2
(45) Date of Patent: Mar. 1, 2016

(54) VIRTUAL INTERVIEW VIA MOBILE DEVICE

(71) Applicant: Verizon Patent and Licensing Inc., Arlington, VA (US)

(72) Inventors: Hong Xiao, Acton, MA (US); Dongchen Wang, Concord, MA (US); Andre R. Turner, Belmont, MA (US); Azim Nasir, Foxboro, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/447,701

(22) Filed: Jul. 31, 2014

(65) Prior Publication Data

US 2016/0034851 A1 Feb. 4, 2016

(51) Int. Cl.
*H04N 7/15* (2006.01)
*G06Q 10/10* (2012.01)
*H04N 7/14* (2006.01)

(52) U.S. Cl.
CPC .......... *G06Q 10/1053* (2013.01); *H04N 7/141* (2013.01)

(58) Field of Classification Search
CPC .......................... G06Q 10/1053; H04N 7/141
USPC .............. 345/424; 434/219, 362, 323; 705/1, 705/7.42, 321, 14.13; 381/77; 704/275; 709/206; 715/756
See application file for complete search history.

(56) References Cited

U.S. PATENT DOCUMENTS

| 7,734,699 | B2 * | 6/2010 | Bhatnagar | G06Q 30/02 706/14 |
| 8,144,148 | B2 * | 3/2012 | El Dokor | G06F 3/011 345/158 |
| 8,831,999 | B2 * | 9/2014 | Bolton | G06Q 10/1053 705/320 |
| 2002/0016797 | A1 * | 2/2002 | Taysi | G06Q 10/107 715/255 |
| 2003/0170597 | A1 * | 9/2003 | Rezek | G09B 19/00 434/219 |
| 2004/0186743 | A1 * | 9/2004 | Cordero, Jr. | G09B 7/00 705/321 |
| 2004/0267554 | A1 * | 12/2004 | Bowman | G06Q 10/06398 705/321 |
| 2005/0060175 | A1 * | 3/2005 | Farber | G09B 7/02 705/321 |
| 2005/0257235 | A1 * | 11/2005 | Lin | G06Q 10/00 725/1 |

(Continued)

*Primary Examiner* — Gerald Gauthier

(57) ABSTRACT

A device executes a virtual interview application, and receives first user input, via the virtual interview application, to create multiple first media clips for a first virtual interview, with each of the first media clips including a different interview question. The device submits, from the device to a remote network device, the multiple first media clips for conducting the first virtual interview with a plurality of first interviewees.

20 Claims, 14 Drawing Sheets

U.S. PATENT DOCUMENTS

| | | | | |
|---|---|---|---|---|
| 2006/0257840 A1* | 11/2006 | Risch | G06Q 30/02 | 434/323 |
| 2007/0088601 A1* | 4/2007 | Money | G06Q 10/1053 | 705/321 |
| 2007/0185723 A1* | 8/2007 | Shellnutt | G06Q 10/1053 | 705/321 |
| 2008/0086504 A1* | 4/2008 | Sanders | G06Q 10/10 | |
| 2008/0300966 A1* | 12/2008 | Gocha, Jr. | G06Q 10/063112 | 705/7.14 |
| 2009/0252481 A1* | 10/2009 | Ekstrand | H04N 5/772 | 386/239 |
| 2009/0286219 A1* | 11/2009 | Kisin | G06Q 10/10 | 434/362 |
| 2009/0319289 A1* | 12/2009 | Pande | G06Q 30/02 | 705/1.1 |
| 2010/0241581 A1* | 9/2010 | Duraiswamy | G06Q 10/1053 | 705/321 |
| 2011/0252340 A1* | 10/2011 | Thomas | G06Q 50/01 | 715/756 |
| 2014/0006120 A1* | 1/2014 | Bonomini | G06Q 30/0211 | 705/14.13 |
| 2014/0086430 A1* | 3/2014 | Dudek | H04H 60/07 | 381/77 |
| 2014/0156550 A1* | 6/2014 | Olivier | G06Q 10/1053 | 705/321 |
| 2014/0317009 A1* | 10/2014 | Bilodeau | G06Q 10/1053 | 705/321 |
| 2015/0046357 A1* | 2/2015 | Danson | G06Q 10/1053 | 705/321 |
| 2015/0120398 A1* | 4/2015 | Olivier | G06Q 10/06398 | 705/7.42 |
| 2015/0134340 A1* | 5/2015 | Blaisch | G06F 3/04842 | 704/275 |

* cited by examiner

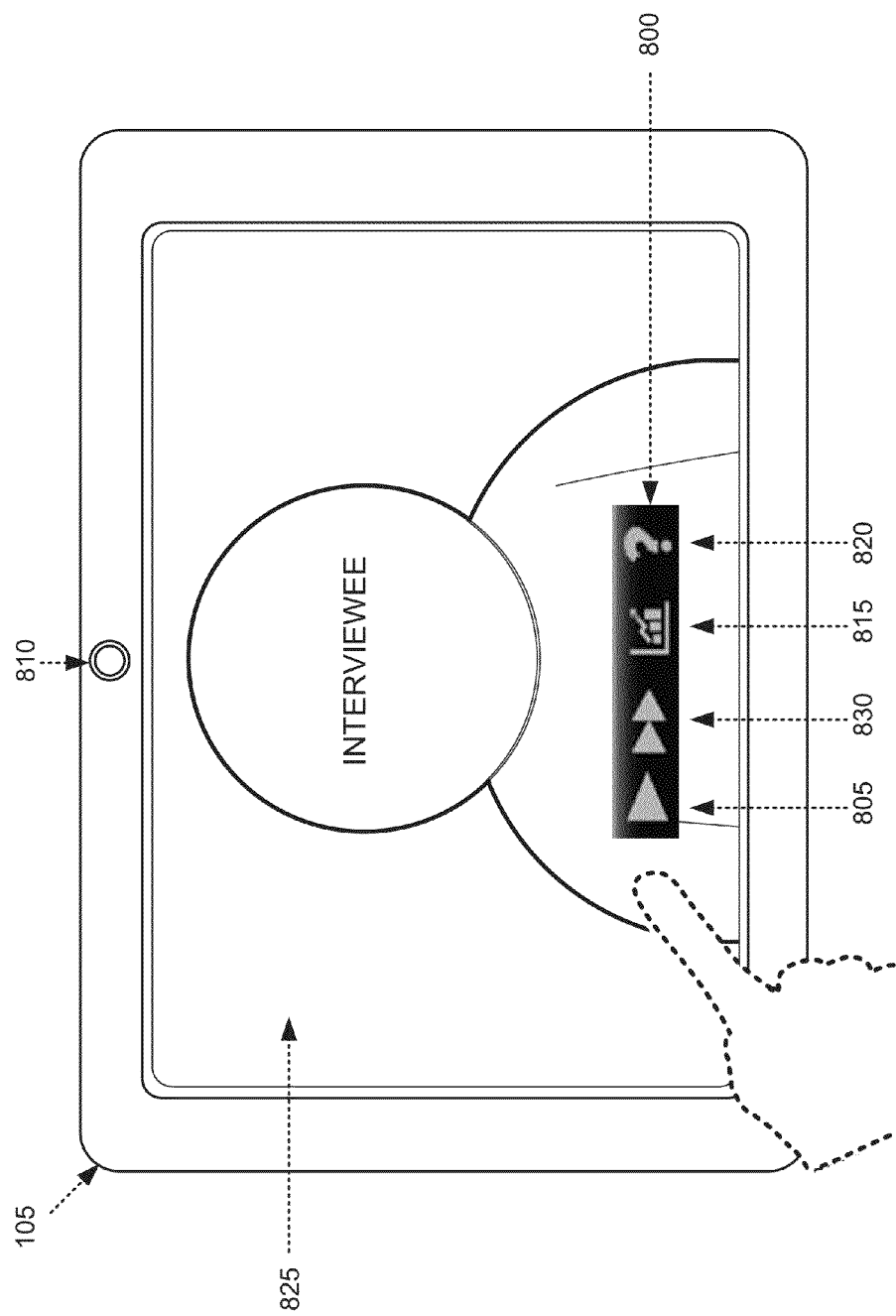

VIRTUAL INTERVIEW VIA MOBILE DEVICE

BACKGROUND

Most organizations, when contemplating hiring employees, conduct on-site, in-person job interviews with job candidates as an essential component of evaluating the job candidates for filling an open position with the organizations. On-site job interviews can be costly, both in terms of man-hours and monetary expenditures (e.g., travel expenses). Additionally, in-person interviews lack flexibility in regards to scheduling—interviewers and interviewees must commit to a day and time for conducting the interview and the interview can be difficult to re-schedule once initially scheduled. Also, when multiple job candidates are being interviewed for a same position, the interviewer typically has to repeatedly ask the same questions of the candidates, and field many of the same questions from the candidates.

BRIEF DESCRIPTION OF THE DRAWINGS

FIGS. 8A and 8B are diagrams of an exemplary graphical user interface used in the process of FIGS. 7A, 7B and 7C;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein relate to a virtual interview application that may be installed at a device for creating automated virtual interviews for participation by multiple interviewees who are being considered by an organization for placement in a certain position within the organization. The virtual interview application may additionally be downloaded at other devices, such as cellular "smart" telephones, and each of the interviewees at these other devices may execute the virtual interview application to interact with a previously created automated virtual interview. An interviewer may create a virtual interview that includes, among other data, multiple media clips containing multiple different interview questions, and the virtual interview may be stored at a remote network device. Interviewees, based on received electronic notifications, may engage in the automated virtual interview with the remote network device, and the interviewees' responses may be stored for subsequent review and/or evaluation upon completion of the automated virtual interview.

Figure 1:
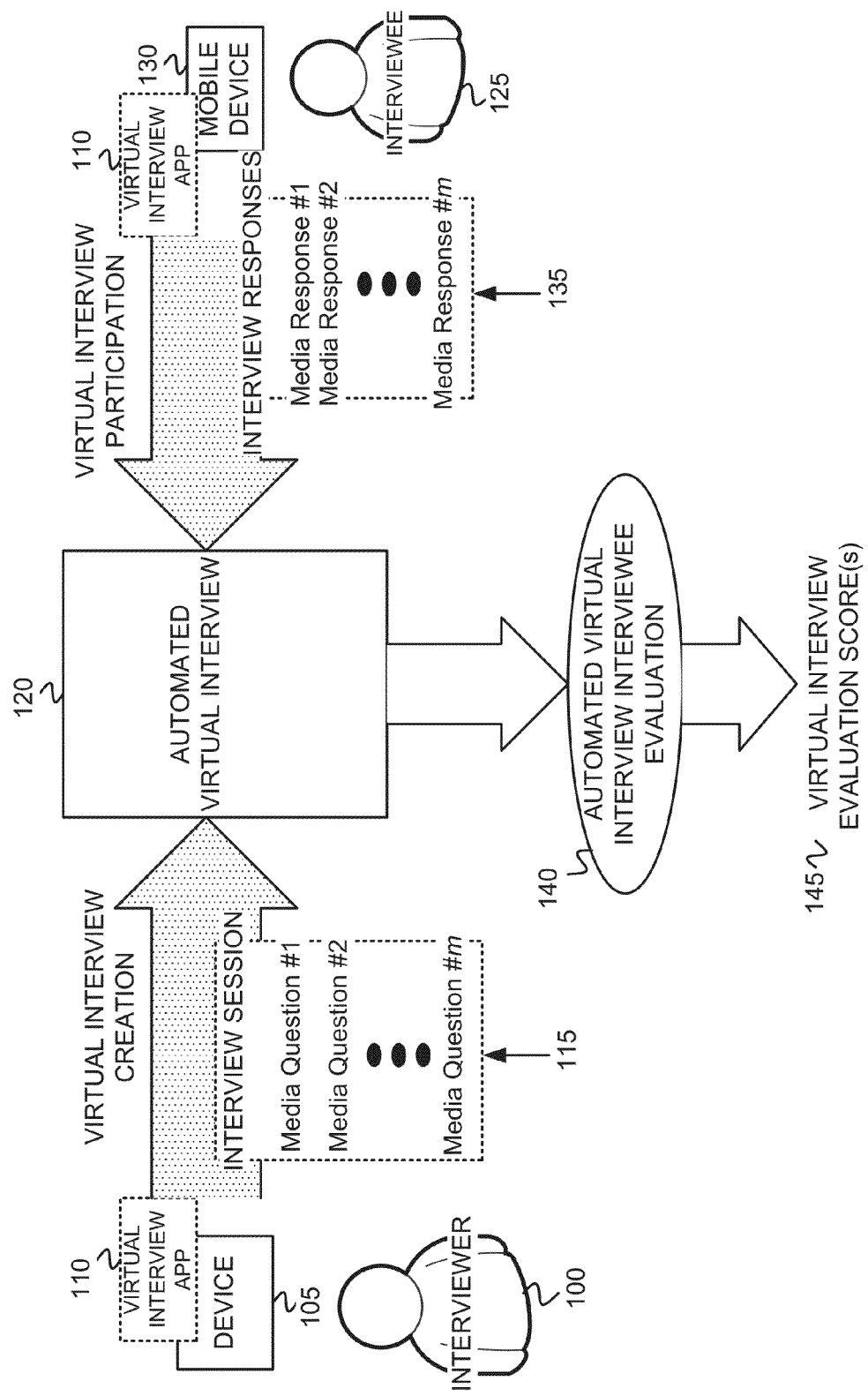
FIG. 1 depicts an overview of an exemplary embodiment in which a virtual interview application may be used to conduct automated virtual interviews with one or more interviewees.

FIG. 1 depicts an overview of an exemplary embodiment in which a virtual interview application may be used to conduct automated virtual interviews with one or more interviewees. As shown in FIG. 1, an interviewer 100 may use a virtual interview application (app) 110 installed on a device 105 to create a virtual interview for future use in interviewing one or more interviewees. When the organization of which interviewer 100 is a part is, for example, a corporation, interviewer 100 may be an employee of the human resources department of the corporation. When the organization is, for example, a partnership, interviewer 100 may be one of the partners of the partnership. Generally, interviewer 100 includes any individual, who is responsible for interviewing job candidates, in the organization that is considering hiring one or more candidates for a position in the organization. The virtual interview created by interviewer 100 may include data related to an interview session 115 that further includes items of digital media (each shown as a "media question #x" in FIG. 1, where "x" is an integer in a range from 1 to m) that contain multiple interview questions that are to be answered by each interviewee of the virtual interview. An "interview session" referred to herein includes one or more interview questions posed by interviewer 100 for a given virtual interview. Each interview question may further include one or more interview objects, such as, for example, one or more digital media objects or items (e.g., images, graphics, text, interactive computer software objects, audio and/or video media clips). For example, the items of digital media may include audio media and/or video media. Interview session 115 may include one or more items of media (e.g., media clips), pictures, graphics, or other types of data associated with each interview question of a virtual interview. To create each of the items of media, interviewer 100 may use a microphone and/or camera associated with device 105 to record interviewer 100 posing each of multiple different interview questions. For example, a first item of media may include a first video clip that records interviewer 100 posing a first interview question, and a second item of media may include a second video clip that records interviewer 100 posing a second interview question. Interview session 115 may include additional media objects or items, such as pictures or graphics, that can be presented to an interviewee during a virtual interview.

Data associated with the virtual interview session 115 may be uploaded from device 105 to a remote server (not shown in FIG. 1). One or more interviewees may then be notified (a single interviewee 125 is shown for purposes of simplicity), by the remote server via a respective mobile device 130, of selection for participation in an automated virtual interview 120 that uses stored data from virtual interview session 115. Interviewee 125 may have, for example, previously applied for a specific job/position and may have provided his/her contact address (e.g., phone number of mobile device 130, or email address) for a virtual interview.

A virtual interview app 110 may have been installed in mobile device 130, and interviewee 125 may execute virtual interview app 110 to engage in automated virtual interview 120. While interacting with virtual interview app 110 and engaging in automated virtual interview 120, interviewee 125 may record interview responses 135 (each shown as a "media response #x" in FIG. 1) to each of the interview questions from virtual interview session 115. Each media response may include a recording of interviewee 125's response to a respective one of the interview questions, including an audio and/or video recording (e.g., audio and/or media clip). To generate each media response, interviewee 125 may use a microphone and/or camera associated with mobile device 130 to record themselves answering each of multiple different interview questions. For example, a first item of media may include a first video clip that records interviewee 125 answering a first interview question, and a second item of media may include a second video clip that records interviewee 125 answering a second interview question. As described further below, interviewee 125 may additionally pose his/her own questions to interviewer 100 related to the interview questions, the interview, and/or the job/position for which interviewee 125 is being interviewed, and/or may provide additional input such as, for example, drawings or pictures.

Virtual interview app 110 installed in mobile device 130 may be a same app as virtual interview app 110 installed in device 105, with, in some implementations, different functionality being available to interviewer 100 as compared to the functionality of app 110 being available to interviewee 125. In other implementations, app 110 installed at mobile device 130 may be different from app 110 installed at device 105. In such implementations, app 110 at device 105 may only include functionality for creating a virtual interview, and for observing interviewee's responses to interview questions; and app 110 at mobile device 130 may only include functionality for responding to the stored interview questions of the interview object(s) created by interviewer 100.

Subsequent to completion of automated virtual interview 120, an automated virtual interview evaluation process 140 may be conducted. Automated virtual interview evaluation process 140 may, for example, be performed by the remote server to which data associated with the virtual interview session 115, and the corresponding interview responses 135, have been sent and stored. Virtual interview interviewee evaluation process 140 may analyze, among other factors, interviewee 125's responses to the interview questions to determine attributes of interviewee 125, or interviewee 125's responses, such as accuracy, correctness, credibility, confidence, truthfulness, etc. Virtual interview evaluation process 140 may assign one or more virtual interview interviewee evaluation scores 145 to interviewee 125 based on the results of process 140. One exemplary implementation of automated virtual interview evaluation process 140 is described below with respect to the process of FIG. 10. Other processes, which evaluate different aspects of interviewee 125 and/or interviewee 125's responses than those described with respect to FIG. 10, may alternatively used for virtual interview interviewee evaluation process 140. Evaluation scores 145 may subsequently be used for comparing a group of interviewees interviewing for a same job or position.

Figure 2:
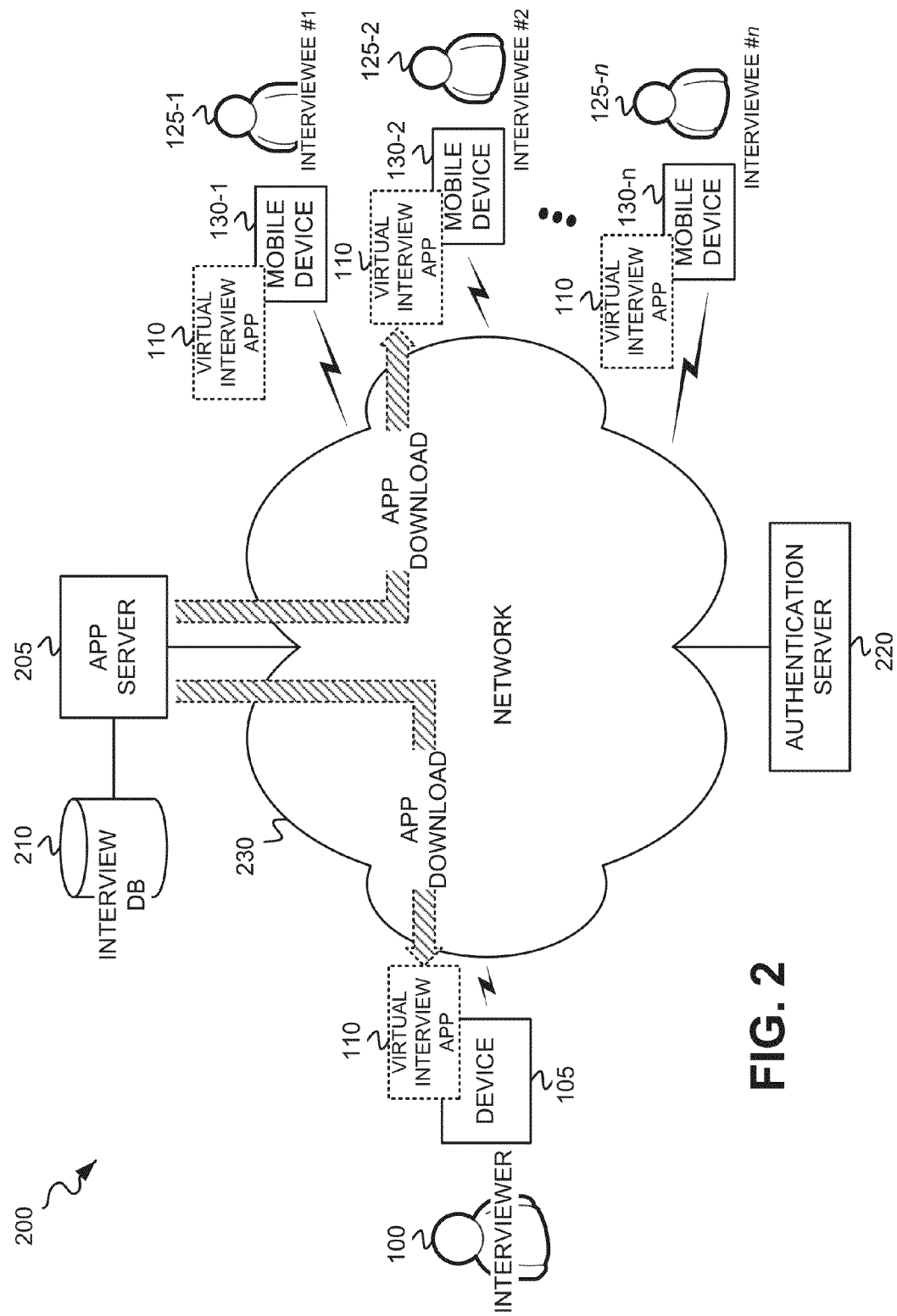
FIG. 2 depicts an exemplary network environment associated with conducting the automated virtual interview shown in FIG. 1.

FIG. 2 depicts an exemplary network environment 200 associated with conducting automated virtual interview 120 of FIG. 1. Network environment 200 may include device 105, mobile devices 130-1 through 130-n, app server 205, interview database (DB) 210, authentication server 220, and network 230.

Device 105 may include any type of computational device that can connect with, and communicate via, network 230 over a wired or wireless connection. Device 105 may additionally incorporate, or be connected to, a microphone for capturing audio from interviewer 100 and a camera for capturing pictures or video associated with interviewer 100. Device 105 may include, for example, a computer (desktop, laptop, palmtop, or tablet computer), a cellular telephone, a personal digital assistant (PDA), a digital media playback device (e.g., MP3 player), a set-top box (STB) connected to a television, or a "smart" television. Virtual interview app 110 may be downloaded from app server 205 (or from another network device) and installed at device 105.

Mobile devices 130-1 through 130-n (where n is a positive integer greater than or equal to one) may each include a portable, handheld computational device that communicates with network 230 via a wireless connection. In one implementation, mobile devices 130-1 through 130-n may each include, for example, a cellular telephone (e.g., a "smart" phone), a PDA, a palmtop or tablet computer, or a digital media playback device (e.g., MP3 player). In this implementation, each of mobile devices 130-1 through 130-n may incorporate, or be connected to, a microphone for recording audio associated with a respective interviewee 125 and a camera for capturing pictures or video associated with the respective interviewee 125. Virtual interview app 110 may be downloaded from app server 205 (or from another network device) and installed at each of mobile devices 130-1 through 130-n.

In other implementations, mobile devices 130-1 through 130-n may not be portable and/or handheld, but may include any type of computational device that can connect with, and communicate via, network 230 over a wired or wireless connection. In such implementations, mobile device 130 may incorporate, or be connected to, a microphone for capturing audio from interviewer 100 and a camera for capturing pictures or video associated with interviewee 125. As an example, devices 130-1 through 130-n may each include a desktop or laptop computer, a set-top box (STB) connected to a television, or a "smart" television.

App server 205 may include a network device that connects to network 230 via a wired or wireless connection. App server 205 may facilitate downloads of virtual interview apps 110 to device 105 or mobile devices 130-1 through 130-n via network 230. App server 205 may additionally receive and store data associated with multiple different virtual interviews, such as, for example, media clips associated with interviewer questions and interviewee responses. App server 205 may receive and store the data associated with the multiple different virtual interviews in interview DB 210.

Interview DB 210 may include a network device that has memory for storing data associated with multiple different virtual interviews. App server 205 may store the data in, and retrieve the data from, interview DB 210. Authentication server 220 may include a network device that obtains credentials from interviewer 100 and/or interviewees 125-1 through 125-n and authenticates the credentials for creating, or engaging, in one of multiple different virtual interviews.

Network 230 may include one or more different types of networks including, for example, a Public Switched Telephone Network (PSTN), a local area network (LAN), a wide area network (WAN), a metropolitan area network (MAN), a wireless network, an intranet, the Internet, or a cable network (e.g., an optical cable network). The wireless network may include a satellite network, a Public Land Mobile Network (PLMN), or a wireless LAN or WAN (e.g., Wi-Fi).

The configuration of network components of network environment 200 illustrated in FIG. 2 is for illustrative purposes. Other configurations may be implemented. Therefore, network environment 200 may include additional, fewer and/or different components, that may be configured in a different arrangement, than those depicted in FIG. 2. For example, network environment 200 may include any number of interviewers 100, devices 105, interviewees 125, and/or mobile devices 130. A single interviewer 100 is depicted in FIG. 2. However, multiple different interviewers, each possibly being associated with a different interviewing organization, may create virtual interviews via a different device 105 having a virtual interview app 110 installed.

Figure 3:
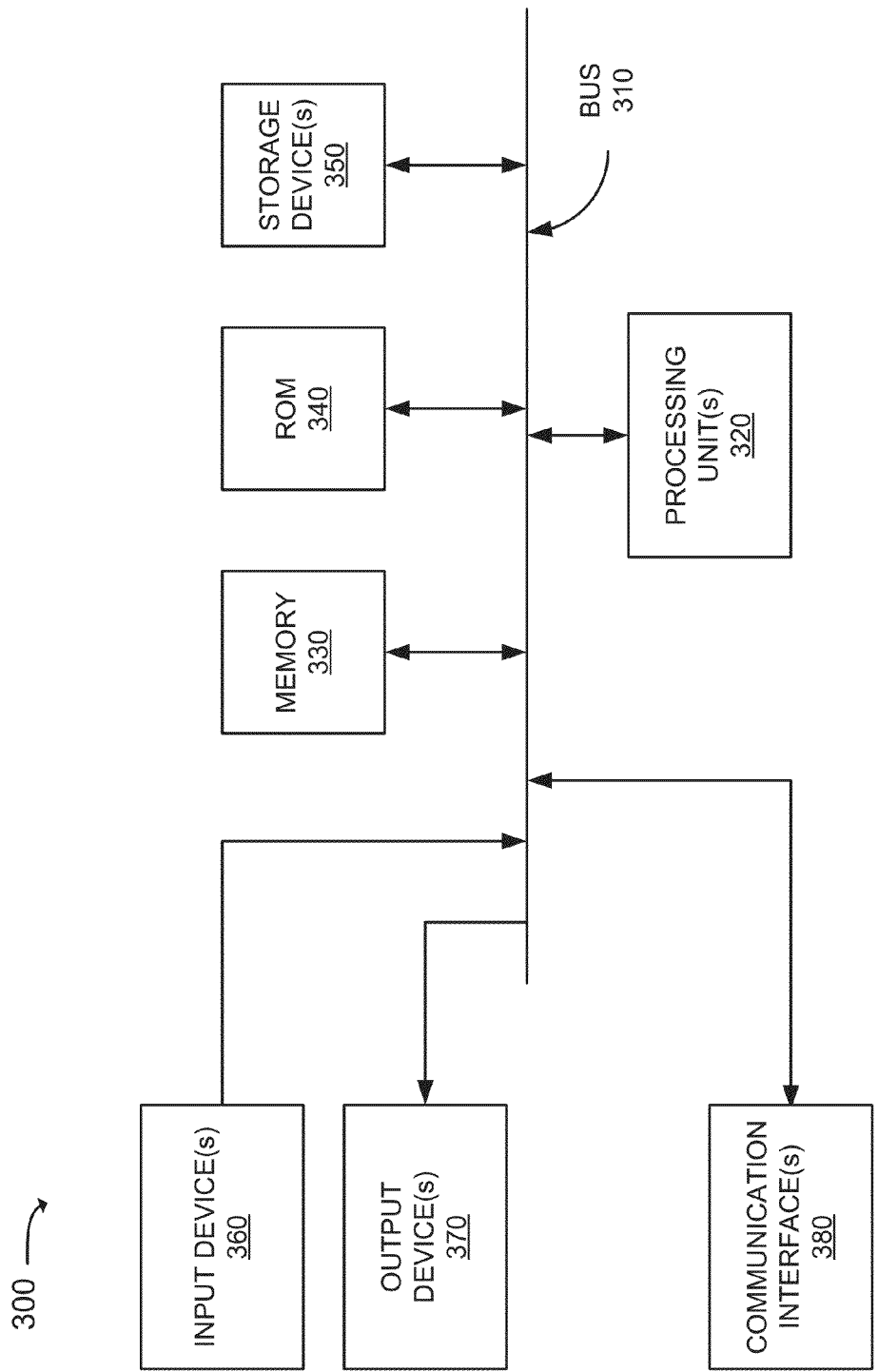
FIG. 3 is a diagram that depicts exemplary components of a device that may correspond to the device, application server, authentication server and/or mobile devices of FIG. 2.

FIG. 3 is a diagram that depicts exemplary components of a device 300. Device 105, app server 205, authentication server 220 and mobile devices 130-1 through 130-n may each have the same or similar components in a same or similar configuration to that shown in FIG. 3. Device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of device 300.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible" and/or "non-transitory computer-readable medium."

Input device 360 may include one or more mechanisms that permit an operator (or user) to input information to device 300, such as, for example, a keypad or a keyboard, a microphone, a camera (e.g., image or video), a display with a touch sensitive panel (e.g., a graphical user interface (GUI)), voice recognition and/or biometric mechanisms, etc. Output device 370 may include one or more mechanisms that output information to the operator, including a display, a speaker, etc. Communication interface(s) 380 may include a transceiver that enables device 300 to communicate with other devices and/or systems. For example, communication interface(s) 380 may include a wired or wireless transceiver(s) for communicating via network 230. For a wireless transceiver(s), communication interface(s) 380 may, for example, include a cellular network transceiver, a BlueTooth transceiver, and/or a Wi-Fi transceiver.

The configuration of components of device 300 illustrated in FIG. 3 is for illustrative purposes only. Other configurations may be implemented. Therefore, device 300 may include additional, fewer and/or different components, or differently arranged components, than those depicted in FIG. 3.

Figure 4:
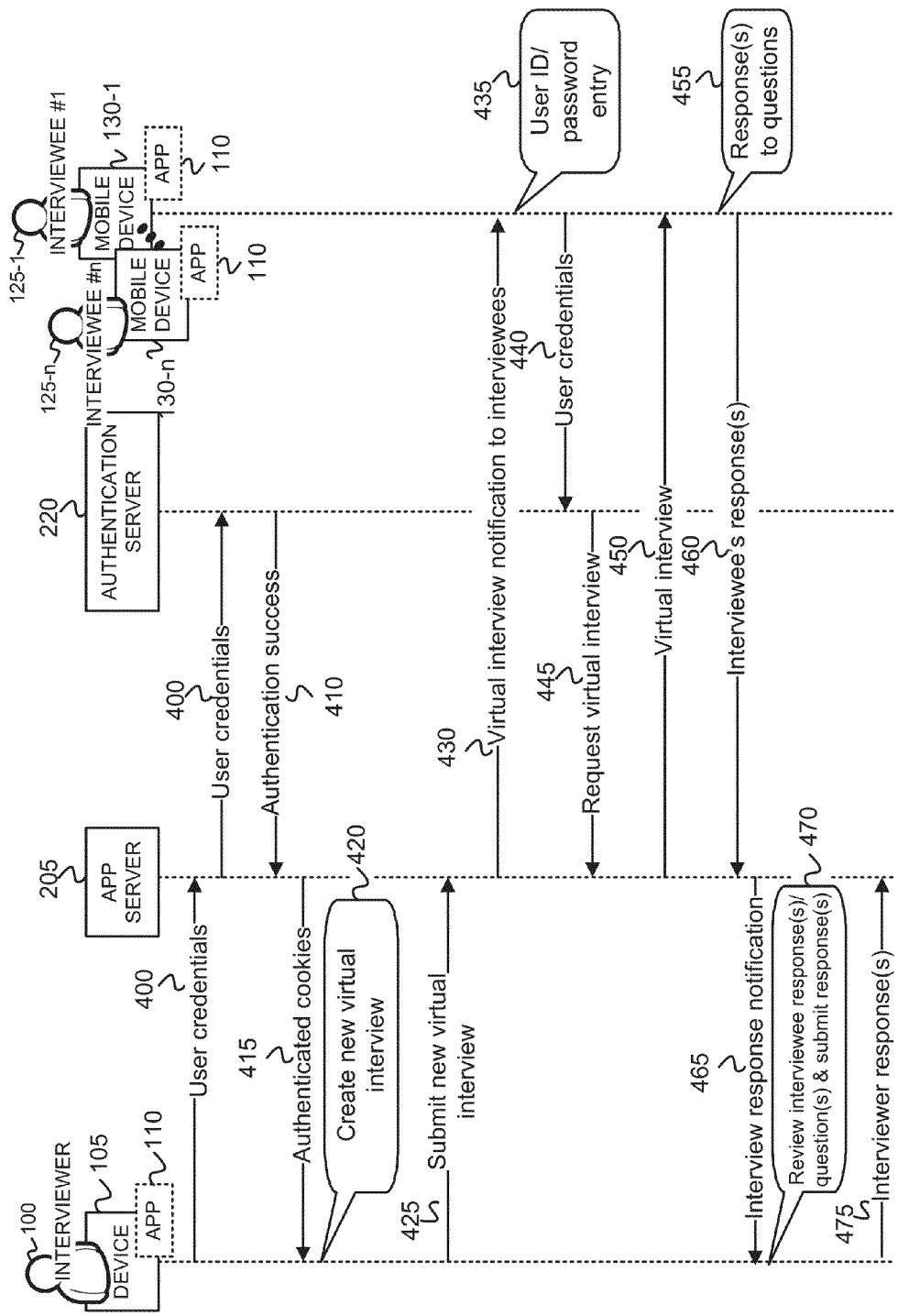
FIG. 4 is a diagram depicting examples of messaging and device interaction associated with creating and conducting a virtual interview in accordance with exemplary processes described herein.

FIG. 4 is a diagram depicting examples of messaging and device interaction associated with creating and conducting an automated virtual interview in accordance with exemplary processes described herein. As shown in FIG. 4, interviewer 100 at device 105 may begin virtual interview creation by sending user credentials 400 to app server 205 which, in turn, forwards the user credentials 400 to authentication server 220. Authentication server 220 performs an authentication process upon the user credentials 400, and then returns an indication of authentication success 410 to app server 205. Upon receipt of the indication of authentication success 410, app server 205 generates authenticated cookies 415 and sends them to device 105.

At device 105, interviewer 100 creates 420 a new virtual interview using virtual interview app 110, as described further below with respect to FIGS. 5A and 5B. Subsequent to creation of the virtual interview, interviewer 100, via device 105, submits 425 the new virtual interview to app server 205. In the example depicted in FIG. 4, app server 205, after receiving the new virtual interview, sends a virtual interview notification 430 to selected interviewees 125-1 through 125-n at respective mobile devices 130-1 through 130-n.

Upon receipt of a respective virtual interview notification 430 at a mobile device 130, an interviewee 125 may enter 435, as user credentials 440, a user identification (ID) and password into mobile device 130. Mobile device 130 sends the user credentials 440 to authentication server 220 for user authentication. Subsequent to user authentication, authentication server 220 sends a request 445 for a virtual interview to app server 205.

Upon receipt of the request 445 for a virtual interview, app server 205 sends data associated with a virtual interview 450 to the interviewee 125 at mobile device 130. Virtual interview app 110 at mobile device 130 receives the data (e.g., media clips, etc.) associated with the virtual interview 450, and presents interview questions contained in the virtual interview 450 to interviewee 125, as described further below with respect to FIGS. 7A-7C. Virtual interview app 110 receives the interviewee's responses 455 to the interview questions, and sends a message 460 containing the interviewee's responses to app server 205. In addition to interviewee responses to interview questions, virtual interview app 110 may additionally receive the interviewee's own questions from interviewee 125 (e.g., a question(s) regarding the interview question itself, or a general question(s) regarding the interview in its entirety or organization or job for which the interview is for). App server 220, upon receipt of message 460 containing the interviewee's interview responses, sends an interview response notification 465 to interviewer 100 at device 105. Interviewer 100, using virtual interview app 110, reviews 470 the interviewee's responses to interview questions and any interviewee questions, and then submits interviewer responses. Device 105 sends a message 475 including the interviewer responses to app server 205, for further provision to the interviewee (not shown in FIG. 4). In one implementation, app 110 at device 105 may include an interview calendar plug-in that assesses a given interviewee's virtual interview schedule, and coordinates interviewer 100's interview response schedule.

Figure 5A:
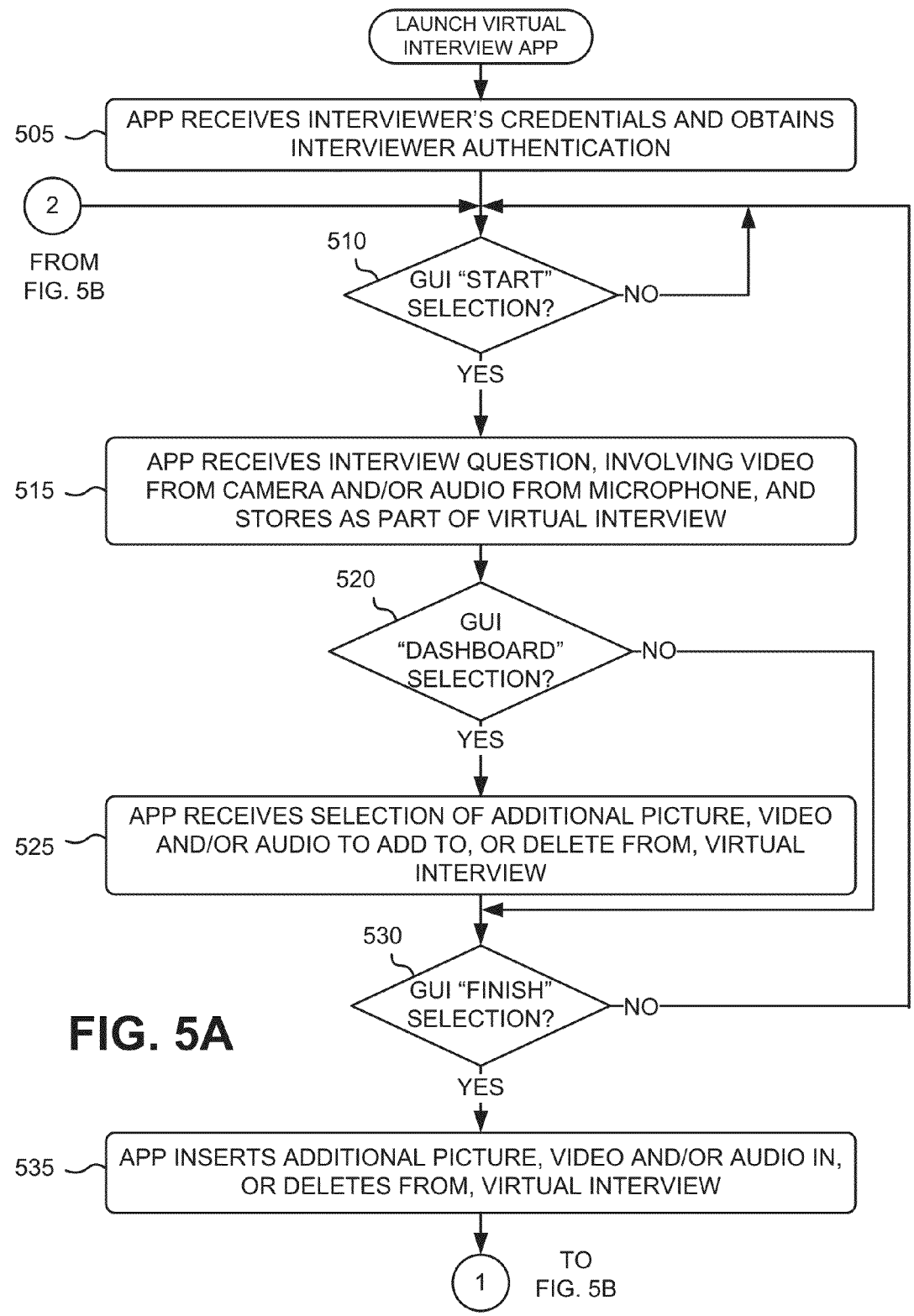
FIGS. 5A and 5B are flow diagrams that illustrate an exemplary process for creating a virtual interview that can be accessed and conducted remotely by multiple interviewees.
Figure 5B:
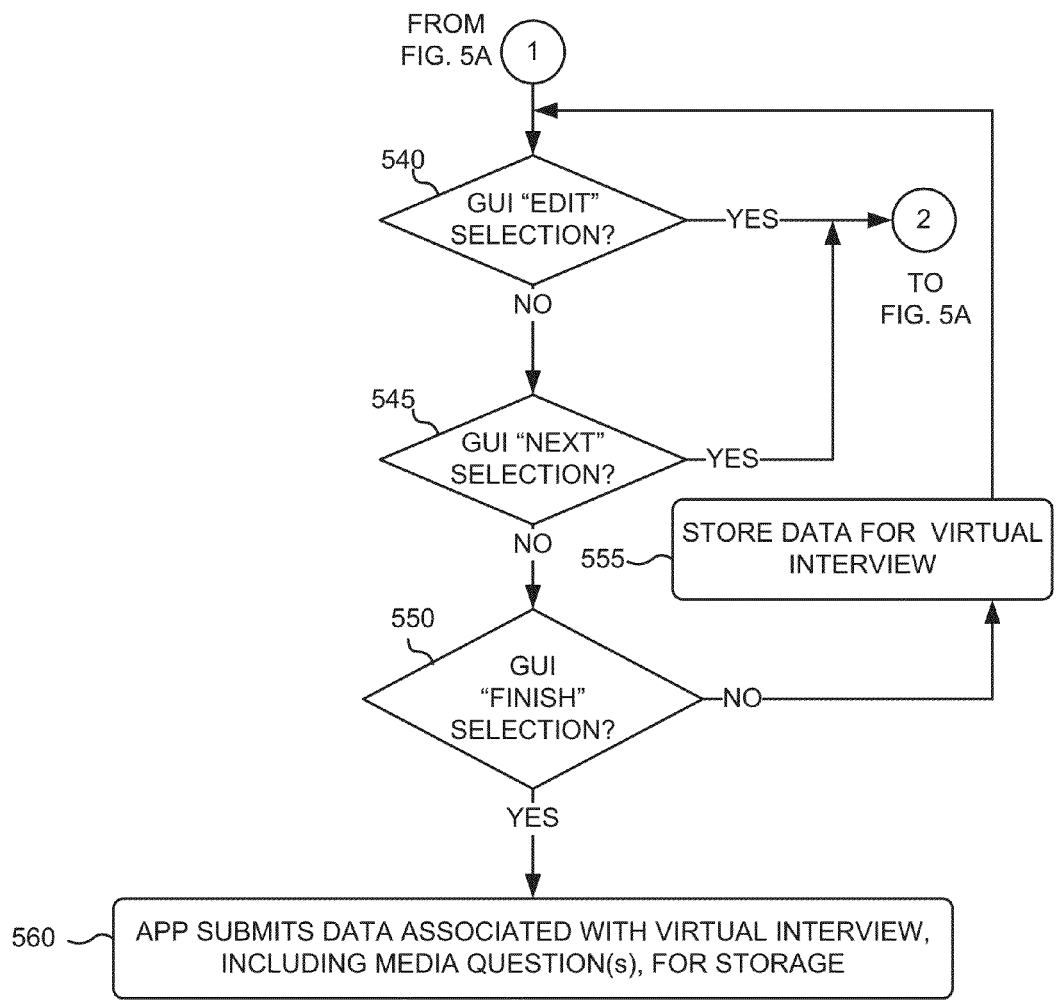

FIGS. 5A and 5B are flow diagrams that illustrate an exemplary process for creating a virtual interview that can be accessed and conducted remotely by multiple interviewees. Prior to beginning the exemplary process of FIGS. 5A and 5B, a virtual interview app 110 may have been installed at device 105, and interviewer 100 may have launched (i.e., executed) the app. The exemplary process of FIGS. 5A and 5B may be implemented by virtual interview app 110 at device 105. The exemplary process of FIGS. 5A and 5B is described below with reference to the exemplary graphical user interface (GUI) of FIG. 6. An interviewer 100 at a device 105 may provide the input to virtual interview app 110 to create a virtual interview. Multiple different interviewers may independently execute the process of FIGS. 5A and 5B to create multiple different virtual interviews that may, for example, each be uploaded to app server 205 for storage in interview DB 210. For example, a first interviewer may, using the process of FIGS. 5A and 5B, create a first virtual interview and may upload the first virtual interview to app server 205. Furthermore, a second interviewer may, using the process of FIGS. 5A and 5B, create a second virtual interview, that is different from the first virtual interview, and may upload the second virtual interview to app server 205. The first virtual interview and second virtual interview may be accessed independently by multiple different interviewees.

The exemplary process may include virtual interview app 110 receiving interviewer 100's credentials and obtaining interviewer authentication (block 505). Interviewer 100 may, for example, manually enter a user name and password as the user credentials. As shown in FIG. 4, device 105 may send the user credentials 400 to app server 205 which, in turn, forwards the user credentials 400 to authentication server 220. Upon successful authentication of the user credentials 400, authentication server 220 may return a message 410 indicating authentication success to app server 205. As further depicted in FIG. 4, app server 220, responsive to receipt of authentication success message 410, may return authenticated cookies 415 to device 105 for use in interacting with app server 205 when creating the virtual interview.

App 110 determines if a "start" selection has been received via the GUI (block 510). Referring to the GUI of FIG. 6, the interviewer orients device 105 such that its camera 600 is directed towards the interviewer. The interviewer may then select, via the GUI toolbar 610 presented on the display of device 105, a "start" button 615 to cause the camera to begin recording video 620 and audio of the interviewer. Block 510 repeats until a "start" selection has been received. If a "start" selection has been received (YES—block 510), the exemplary process may continue with app 100 receiving an interview question, involving video from a camera associated with device 105, and/or audio from a microphone associated with device 105, and stores as part of the current virtual interview (block 515). Once the interviewer selects "start" button 615 on toolbar 610 of the GUI, the interviewer may pose the interview question while device 105 records video and audio of the interviewer posing the question. The interviewer, thus, creates a media clip, such as an audio and/or video media clip, that includes a recording of the interview question posed by the interviewer. The media clip may, for example, include any type and/or format of audio and/or video media.

App 110 determines if a "dashboard" selection has been received via the GUI (block 520). Referring again to FIG. 6, the interviewer may select, via the GUI toolbar 610 presented on the display of device 105, a "dashboard" button 625 to enable the interviewer to append an additional picture, video and/or audio to the interview object in conjunction with the previously recorded media clip that includes the recording of the interview question. The additional picture, video and/or audio may include additional information (e.g., a two-dimensional plot, a histogram, etc.) related to the current interview question posed by the interviewer. The picture may include any type and format of image data (gif, jpeg, png, etc.), and the audio and/or video may include any type and format of audio and/or video media. If the "dashboard" selection has been received (YES—block 520), app 110 may receive a selection of an additional picture, video and/or audio to add to, or delete from, the virtual interview (block 525). If a "dashboard" selection has not been received (NO—block 520), then the exemplary process may continue at block 530 below.

Figure 6:
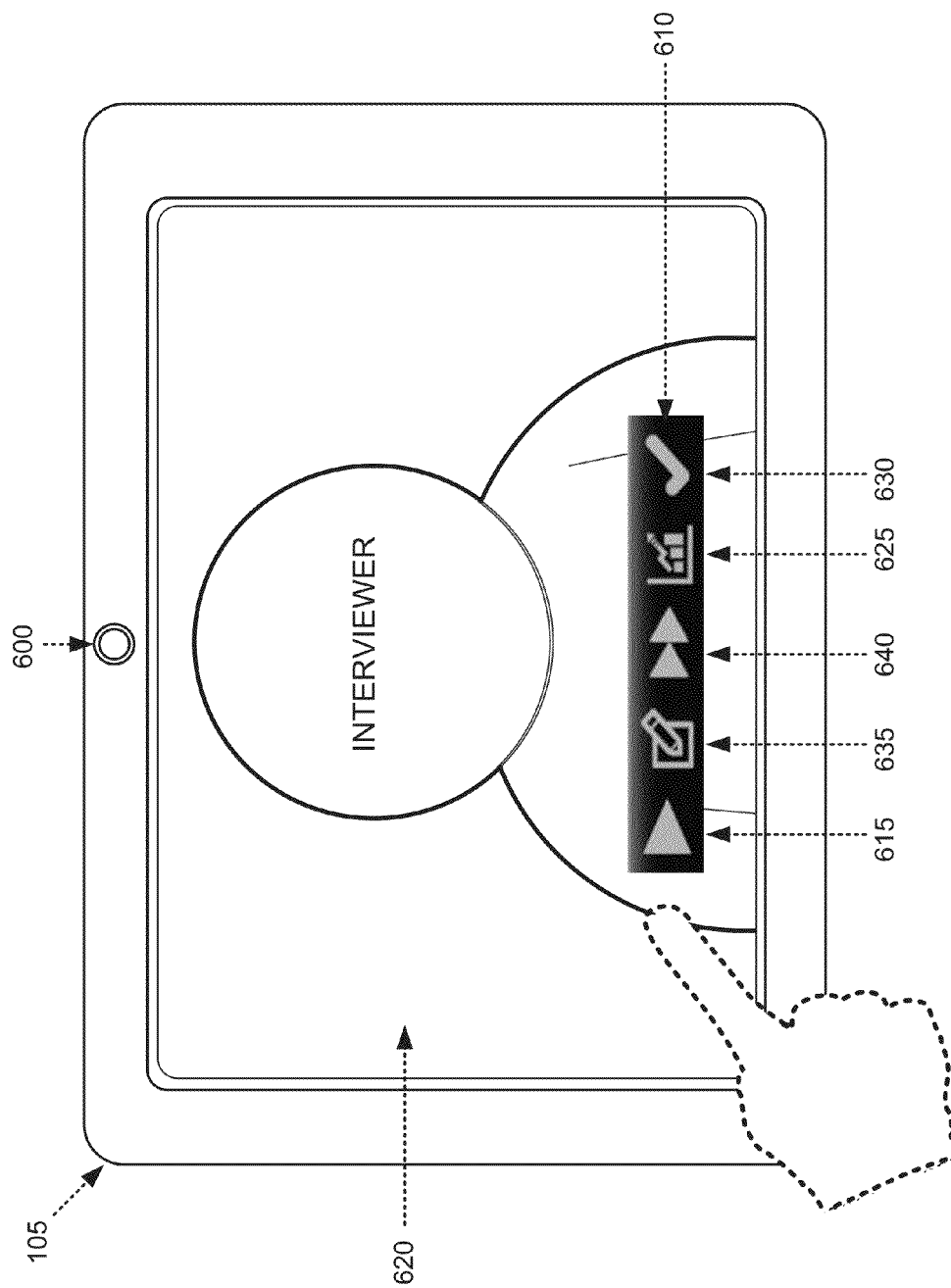
FIG. 6 is a diagram of an exemplary graphical user interface used in the process of FIGS. 5A and 5B.

App 110 determines if a "finish" selection has been received via the GUI (block 530). As shown in FIG. 6, the interviewer may select, via the GUI toolbar 610 presented on the display of device 105, a "finish" button 630 to indicate that the interviewer is satisfied with the video and/or audio associated with the current interview question. If the "finish" selection has not been received (NO—block 530), the exemplary process may return to block 510 with the recording of another subsequent interview question. If the "finish" selection has been received via the GUI (YES—block 530), then app 110 inserts the additional picture, video and/or audio in, or deletes from, the virtual interview (block 535).

App 110 determines if an "edit" selection has been received via the GUI (block 540). The interviewer, subsequent to recording an interview question, may decide that it was unsatisfactory in some manner and may wish to record the interview question again. Referring to FIG. 6, the interviewer may select, via the GUI toolbar 610 presented on the display of device 105, an "edit" button 635 to delete the most recently recorded interview question and to record another interview question, or a different version of the same interview question, in its place. If the "edit" selection has been received (YES—block 540), then the exemplary process may return to block 510 of FIG. 5A to re-record the video and/or audio associated with the interview question.

If the "edit" selection has not been received (NO—block 540), then app 110 determines if a "next" selection has been received via the GUI (block 545). As shown in FIG. 6, the interviewer may select, via the GUI toolbar 610 presented on the display of device 105, a "next" button 640 to proceed with recording a next interview question in the virtual interview using blocks 510-540. If a "next" selection has been received (YES—block 545), then the exemplary process returns to block 510 to record video and/or audio associated with a next interview question that is different from the most recently recorded interview question.

If a "next" selection has not been received (NO—block 545), then app 110 determines if a "finish" selection has been received via the GUI (block 550). As depicted in FIG. 6, the interviewer may select, via the GUI toolbar 610 presented on the display of device 105, "finish" button 630 to proceed with completion of the virtual interview creation process. If the "finish" selection has not been received (NO—block 550), then the exemplary process may store data for the current virtual interview (block 555), including all recorded media clips, and the exemplary process may return to block 540 with virtual interview app 110 determining again whether an "edit" selection has been received via the GUI. If a "finish" selection has been received via the GUI (YES—block 550), indicating that the interviewer is satisfied with the contents of the current virtual interview, then virtual interview app 110 submits data associated with the created virtual interview, including the media interview questions, for storage (block 560). Virtual interview app 110 at device 105 uploads the interview object(s) for the created virtual interview to app server 205 which, in turn, stores the virtual interview in interview DB 210 for future access by interviewees.

Figure 7A:
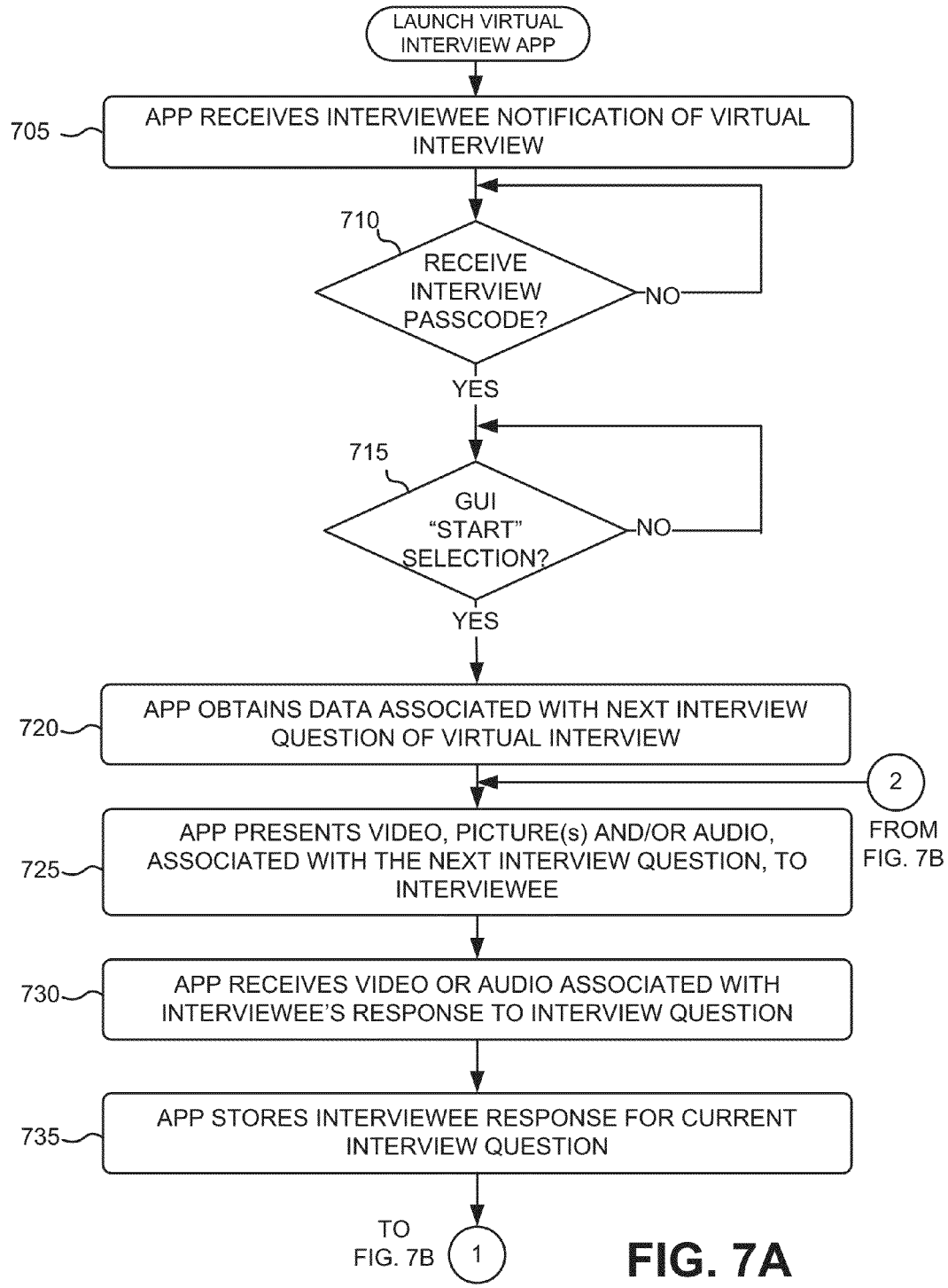
FIGS. 7A, 7B and 7C are flow diagrams that illustrate an exemplary process for interviewee participation in a virtual interview.
Figure 7B:
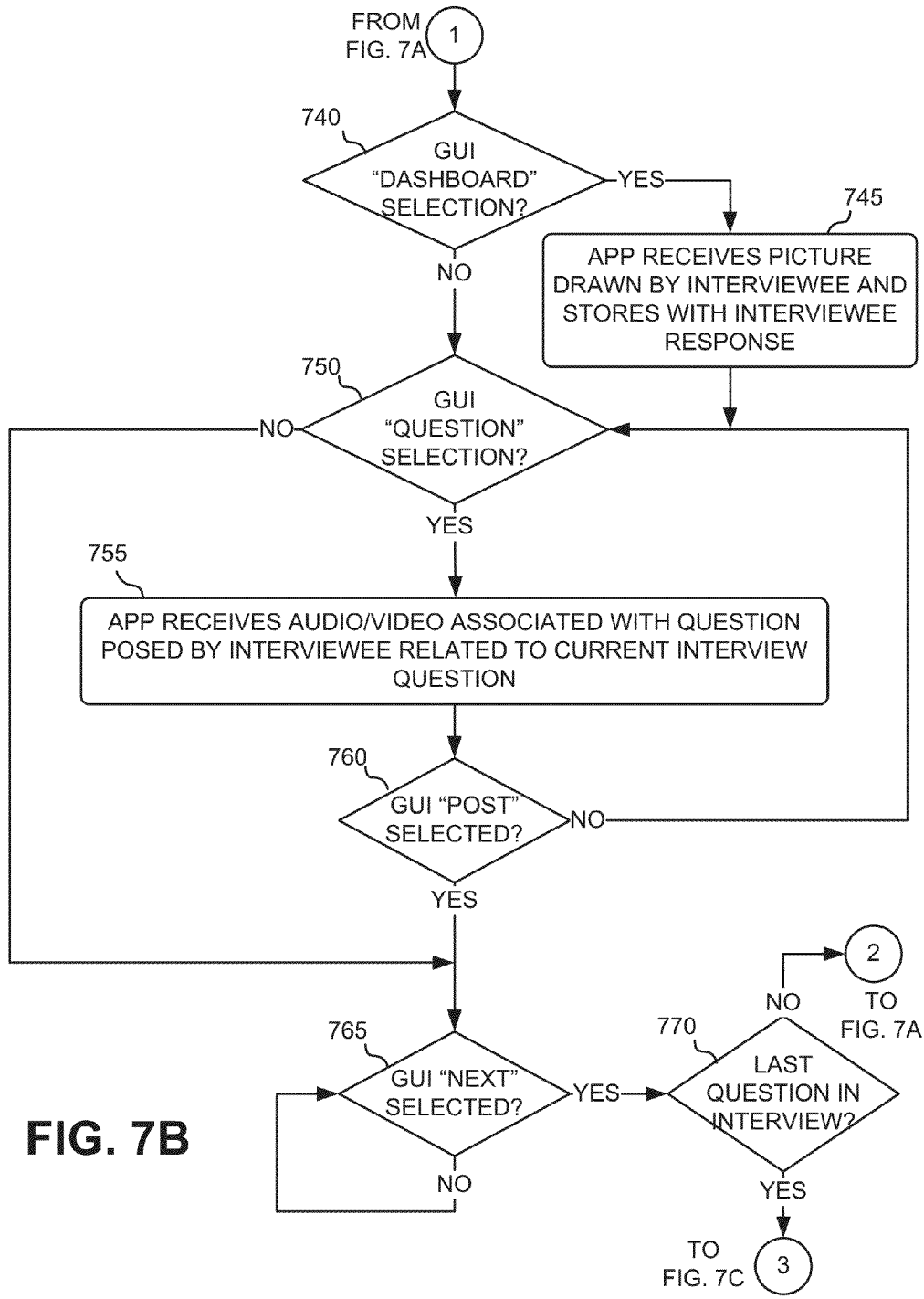
Figure 7C:
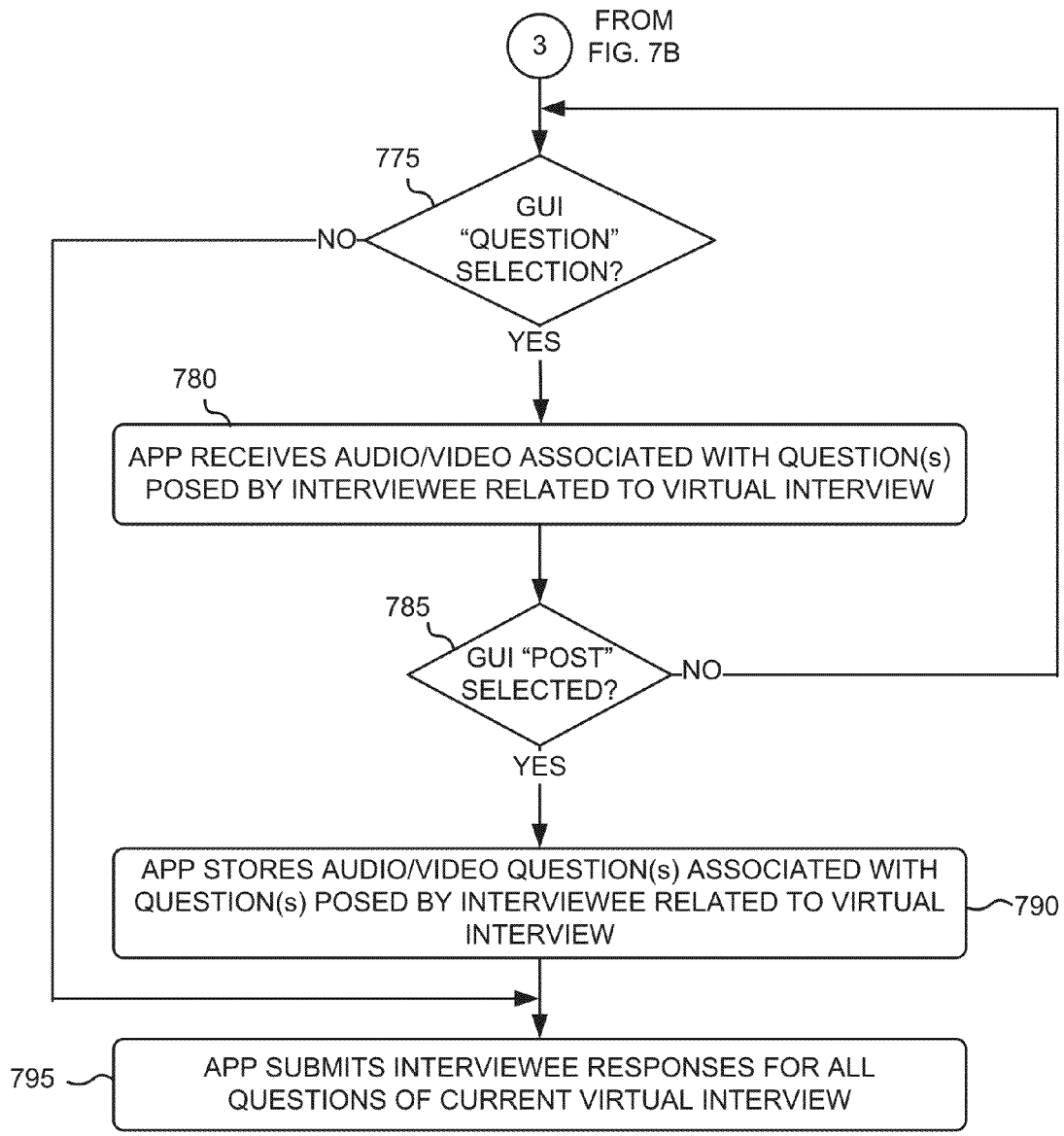
Figure 8B:
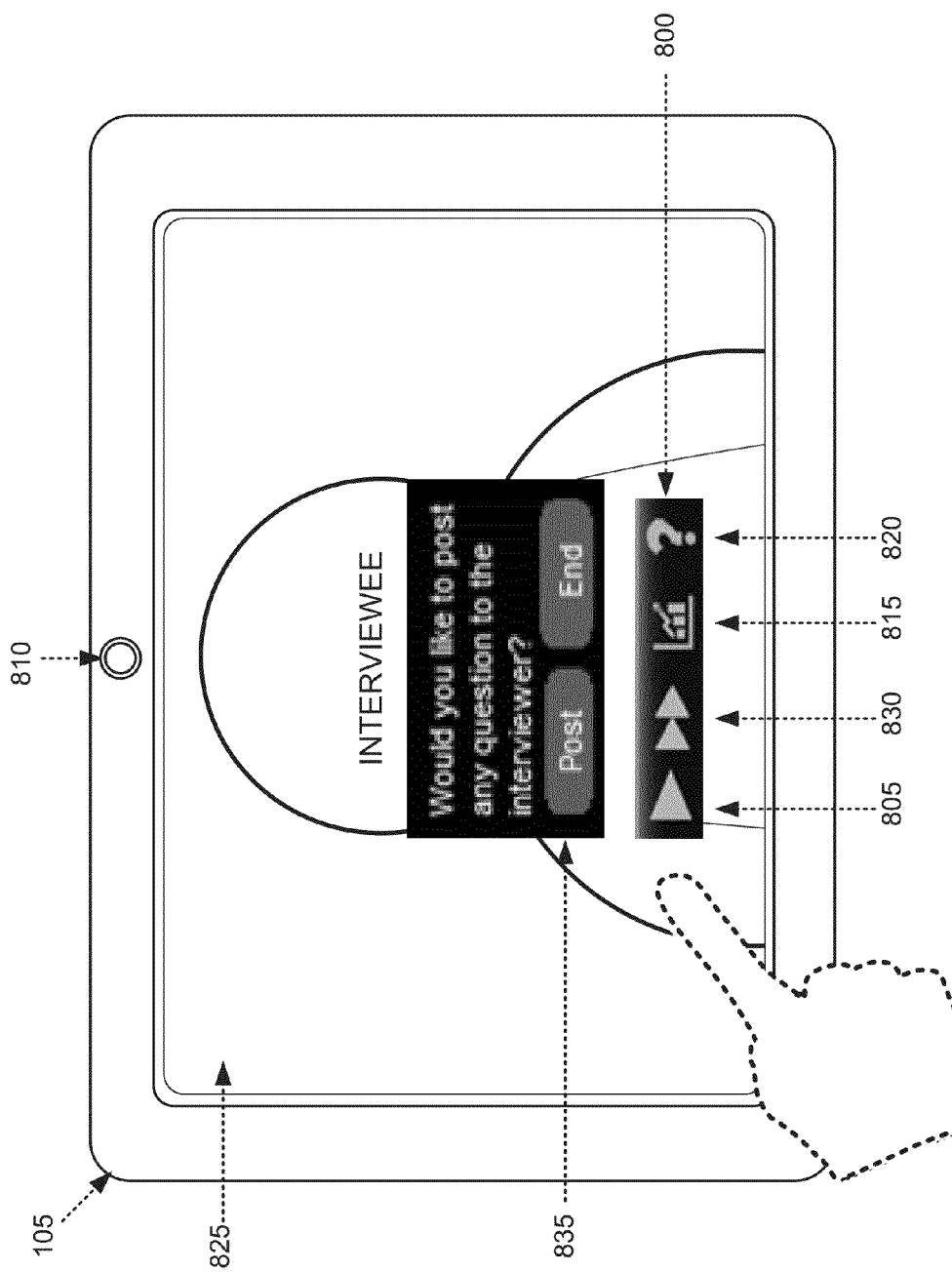

FIGS. 7A, 7B and 7C are flow diagrams that illustrate an exemplary process for interviewee participation in an automated virtual interview. Prior to beginning the exemplary process of FIGS. 7A, 7B and 7C, a virtual interview app 110 may have been installed at mobile device 130, and interviewee 125 may have launched (i.e., executed) the app 110. The exemplary process of FIGS. 7A, 7B and 7C may be implemented by a virtual interview app 110 at mobile device 130. The exemplary process of FIGS. 7A, 7B and 7C is described below with reference to the exemplary graphical user interface (GUI) of FIGS. 8A and 8B.

The exemplary process may include app 110 receiving a notification of a virtual interview for the interviewee to participate in (block 705). As depicted in FIG. 4, app server 205 may send a notification 430 to a device 130 associated with an interviewee 125. A group of interviewee's to which the notification of the virtual interview is sent may be determined as described below with respect to the exemplary process of FIG. 9. In some implementations, the notification may include a specific passcode for the interviewee for the notified virtual interview. In additional implementations, the notification may include a link to a server, such as app server 205, that stores a downloadable version of virtual interview app 110. Upon selection of the link, either app server 205 or code within the selected link automatically detects whether mobile device 130 currently has virtual interview app 110 installed. If not, virtual interview app 110 may, either automatically or via manual interaction by interviewee 125, be downloaded and installed at mobile device 130. Upon successful detection of virtual interview app 110, or successful installation of virtual interview app 110, the notification may include another link to the stored virtual interview in interview DB 210 such that, when selected by interviewee 125, app server 205 retrieves stored data (e.g., media clips and other data) associated with the requested virtual interview and sends to mobile device 130.

App 110 determines if the interview passcode has been received from interviewee 125 (block 710). Upon receipt of the notification of the virtual interview, the interviewee may enter a user ID and password to be authenticated by authentication server 220, and may then enter the passcode previously received in the virtual interview notification. Block 710 repeats until a passcode has been received. If the passcode has been received (YES—block 710), then app 110 determines if a "start" selection has been received via the GUI (block 715). As depicted in FIG. 8A, the interviewee may select, via the GUI toolbar 800 presented on the touch screen display of mobile device 130, "start" button 805 to begin a next interview question of the virtual interview. The next interview question after receipt of the notification would be the first interview question for the virtual interview. Block 715 may repeat until a "start" selection has been received.

If a "start" selection has been received (YES—block 715), then app 110 obtains data associated with a next interview question of the requested virtual interview (block 720). Mobile device 130 may, as shown in FIG. 4, send a request 445 to app server 205 to obtain data associated with the requested virtual interview. The virtual interview may include one or more interview questions, with each interview question further including at least one media clip that contains an interview question, one or more pictures, and/or any other type of media. Each of the media clips may include a video and/or audio clip that includes a different interview question posed by the interviewer for a response by the interviewee.

App 110 presents a video, a picture(s), and/or audio to interviewee 125, including the next interview question of the virtual interview (block 725). App 110 extracts the next media clip, which contains the next interview question of the virtual interview, from the data received from app server 205, and plays the media clip using a display and/or speaker of mobile device 130. App 110 receives video or audio associated with the interviewee's response to the interview question (block 730) and stores the interviewee response for the current interview question (block 735). Upon completion of playback of the media clip containing the interview question, the interviewee orients mobile device 130 such that its camera 810 (FIG. 8A) is directed towards the interviewee. The interviewee may then speak such that camera 810 and mobile device 130's microphone records video and/or audio of the interviewee's response to the interview question. When the interviewee stops speaking for a threshold period of time (e.g., three seconds), app 110 stores the recorded video and/or audio as a media clip. In some implementations, for ensuring confidentiality and that the interviewee answers spontaneously, each interviewee response to an interview question may not be stopped, paused, edited or saved by the interviewee, and each interview question must be answered within a limited time window. For example, audio and/or video recording may cut off and stop after the expiration of the limited time window, whether or not the interviewee has completely responded to the interview question.

App 110 determines if a "dashboard" selection has been received via the GUI (block 740). Referring to FIG. 8A, the interviewee may select, via the GUI toolbar 800 presented on the touch screen display of mobile device 130, a "dashboard" button 815 to enable the interviewee to store an additional picture (or additional video and/or audio) in conjunction with the media clip that includes a response to the interview question. The additional picture may include additional information (e.g., a two-dimensional diagram, etc.) related to the current interview question responded to by the interviewee. The picture may include any type and format of image data (gif, jpeg, png, etc.). If the "dashboard" selection has been received (YES—block 740), then app 110 receives a picture drawn, or entered, by the interviewee and stores it with the interviewee response (block 745), and the exemplary process continues at block 750.

If the "dashboard" selection has not been received (NO—block 740), then app 110 determines if a "question" selection has been received via the GUI (block 750). Referring again to FIG. 8A, the interviewee may select, via the GUI toolbar 800 presented on the touch screen display of mobile device 130, a "question" button 820 to enable the interviewee to provide a question, related to the current interview question from the interviewer, in video and/or audio form. If a "question" selection has been received (YES—block 750), then app 110 receives audio and/or video associated with the question posed by the interviewee that is related to the interviewer's current question (block 755). For example, the interviewee orients mobile device 130 such that its camera 810 (FIG. 8A) is directed towards the interviewee, and the interviewee speaks such that camera 810 and/or mobile device 130's microphone records video and/or audio of the interviewee's question that is related to the current interview question. When the interviewee stops speaking for a threshold period of time (e.g., three seconds), app 110 stores the recorded video and/or audio as a media clip. If app 110 does not receive the "question" selection (NO—block 750), then the exemplary process may continue at block 765 below.

Subsequent to receipt of the video and/or audio associated with the question posed by the interviewee, app 110 determines if a "post" selection has been received via the GUI (block 760). Referring again to FIG. 8B, the interviewee may select, via the GUI toolbar 800 presented on the touch screen display of mobile device 130, a "post" button 835 to enable the interviewee to submit the question, related to the current interview question from the interviewer, in video and/or audio form to app 110 for storage. If a "post" selection has not been received (NO—block 760), then the process returns to block 750 with a determination whether the interviewee wishes to provide a replacement for the audio and/or video containing the interviewee question previously received in block 755. The replacement may include a new video and/or audio media clip to replace the version previously recorded in block 755.

If app 110 determines that a "post" selection has been received via the GUI (YES—block 760), then app 110 determines if a "next" selection has been received via the GUI (block 765). Referring again to FIG. 8B, the interviewee may select, via the GUI toolbar 800 presented on the touch screen display of mobile device 130, a "next" button 830 to have app 110 present a next interview question from the interviewer, including a video and/or audio media clip. Block 765 repeats until a "next" selection is received to proceed to a next interview question.

When the "next" selection has been received (YES—block 765), then app 110 determines if the current interview question is a last interview question in the virtual interview (block 770). If not (NO—block 770), then the exemplary process returns to block 725 (FIG. 7A) with app 110 obtaining and presenting a next interview question associated with a next session of the virtual interview. A last interview question may be determined when all media clips, containing interview questions, have been retrieved and played back from the interview object(s).

If the current interview question is the last interview question (YES—block 770), then app 110 determines if a "question" selection has been received via the GUI (block 775). Referring again to FIG. 8B, the interviewee may select, via the GUI toolbar 800 presented on the touch screen display of mobile device 130, a "question" button 820 to enable the interviewee to provide a question, related to the virtual interview, in audio and/or video form. This interviewee provided question may relate to the entirety of the virtual interview, or to a general question about the position interviewed for, and not to any specific interview question.

If a "question" selection has not been received (NO—block 775), then the process may continue at block 795 below with the submission of the interviewee responses for the virtual interview. If a "question" selection has been received (YES—block 775), then app 110 receives audio and/or video associated with one or more questions posed by the interviewee related to the virtual interview (block 780). The video and/or audio may include one or more media clips that include the one or more questions posted by the interviewee.

App 110 determines if a "post" selection has been received via the GUI (block 785) to post and store the received video and/or audio media clip. Referring again to FIG. 8B, the interviewee may select, via the GUI toolbar 800 presented on the touch screen display of mobile device 130, a "post" button 835 to enable the interviewee to submit the question(s), related to the virtual interview, in video and/or audio form to app 110 for storage.

If a "post" selection has not been received (NO—block 785), then the process may return to block 775 with the re-recording of video and/or audio associated with an interviewee question, where the re-recorded video and/or audio media clip replaces the previously recorded media clip. If a "post" selection has been received (YES—block 785), then app 110 stores the audio and/or video question(s) associated with the question(s) posed by the interviewee related to the virtual interview (block 790). App 110 submits the interviewee responses for all interview questions of the current virtual interview (block 795). The exemplary process of FIGS. 7A-7C may be repeated for each interviewee 125 participating in an automated virtual interview.

Figure 9:
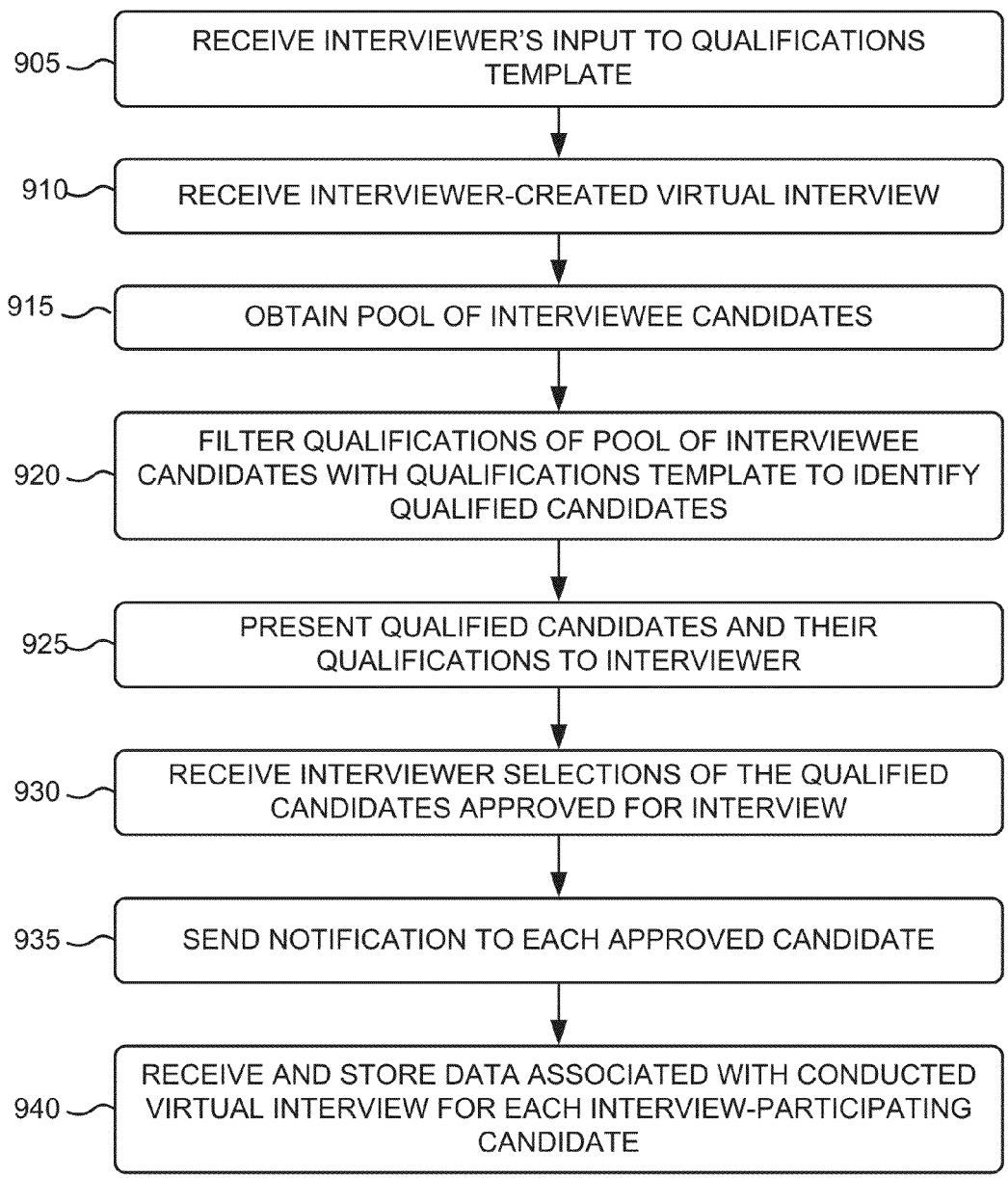
FIG. 9 is a flow diagram that illustrates an exemplary process for interviewer set-up of a virtual interview with one or more interviewees.

FIG. 9 is a flow diagram that illustrates an exemplary process for interviewer set-up of an automated virtual interview with one or more interviewees. The exemplary process of FIG. 9 may be implemented by app server 205. In other implementations, the process of FIG. 9 may be implemented by virtual interview app 110 at device 105, or by app server 205 in conjunction with virtual interview app 110 at device 105.

The exemplary process may include app server 205 receiving the interviewer's input to a qualifications template (block 905). The qualifications template may include a list of required, or preferred, qualifications that a candidate should have to be selected for a specific virtual interview. Qualifications may include, for example, preferred or required college degree(s), years of experience, languages spoken, specific companies worked at, etc. App server 205 receives an interviewer-created virtual interview (block 910). The virtual interview may be created and uploaded to app server 205 as described above with respect to the process of FIGS. 5A and 5B.

App server 205 obtains a pool of interviewee candidates (block 915) and filters the qualifications of the pool of interviewee candidates with a qualifications templates to identify qualified candidates (block 920). App server 205 may receive input data that corresponds to applications and/or resumes of interviewee candidates. App server 205 may analyze the input data, and compare the input data to the qualifications template, to identify candidates that satisfy selection criteria contained in the qualifications template and which, therefore, are identified as initially qualified candidates for the virtual interview. App server 205 presents qualified candidates and their qualifications to the interviewer (block 925). The interviewer may view the initially qualified candidates and their qualifications, and may remove one or more of them based on the interviewer's own judgment regarding their qualifications. App server 205 receives interviewer selections of the qualified candidates approved for interview (block 930). From the candidates remaining after the interviewer has reviewed the candidates, the interviewer may manually select one or more of the qualified candidates that are approved for interview via an automated virtual interview.

App server 205 sends a notification to each approved candidate (block 935). Each candidate has previously registered with app server 205, including providing electronic contact information, and app server 205 sends a notification to each approved candidate via the provided electronic contact. For example, if the candidate provided a text phone number, app server 205 may send a text message with a link to the virtual interview. As another example, if the candidate provided an email address, app server 205 may send an email with a link to the virtual interview. Upon receipt of the notification, the interviewee may conduct the automated virtual interview as described with respect to the process of FIGS. 7A-7C. App server 205 receives and stores data associated with a conducted virtual interview of each interview-participating candidate (block 940). For example, app server 205 receives, as described with respect to block 795 of FIG. 7C, interviewee data from the conducted virtual interview, such as the data described with respect to blocks 730, 745, 755 and/or 780 of FIGS. 7A-7C.

Figure 10:
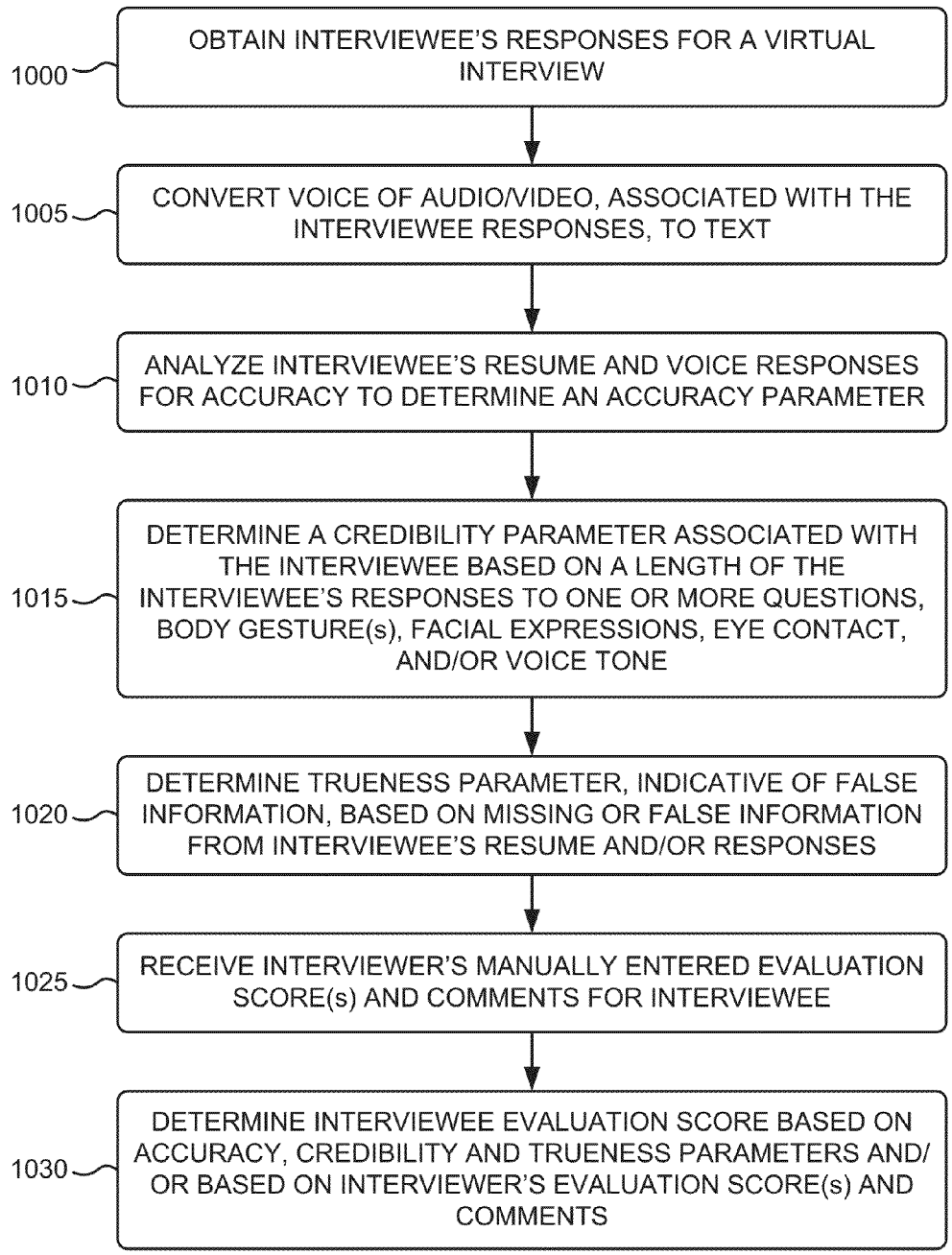
FIG. 10 is a flow diagram that illustrates an exemplary process for evaluating an interviewee who has been interviewed via a virtual interview.

FIG. 10 is a flow diagram that illustrates an exemplary process for evaluating an interviewee who has been interviewed via a virtual interview. The process of FIG. 10 may correspond to the process 140 depicted in FIG. 1. The process of FIG. 10 may occur subsequent to an interviewee participating in a virtual interview, as described with respect to the process of FIGS. 7A-7C above. The exemplary process of FIG. 10 may be implemented by app server 205. In other implementations, the process of FIG. 10 may be implemented by virtual interview app 110 at device 105, or by app server 205 in conjunction with virtual interview app 110 at device 105.

The exemplary process may include app server 205 obtaining an interviewee's responses to interview questions for a given virtual interview (block 1000). App server 205 may index interview DB 210 with an identifier associated with the interviewee, and with an identifier associated with the virtual interview, to retrieve a set of media clips associated with the interviewee's responses to interview questions, and/or questions that the interviewee posed responsive to the interview questions.

App server 205 converts voice of audio and/or video, associated with the interviewee's responses from the virtual interview, to text (block 1005). Speech recognition algorithms may be applied to the audio, from the media clips corresponding to the interviewee's responses during the virtual interview, to convert the voice to text. App server 205 analyzes an interviewee's resume and voice responses for accuracy to determine an accuracy parameter (block 1010). For example, app server 205 may analyze the text of the interviewee's responses and compare keywords from the text with the interviewee's resume to identify any inaccuracies or discrepancies between the two. App server 205 may apply an algorithm to the comparison to generate an accuracy parameter. For example, app server 205 may determine an accuracy parameter as follows:

$$\text{accuracy\_parameter} = (y/x) * 10 \qquad \text{Eqn. (1)}$$

where x is a number of keywords identified in the text of the interviewee's responses, y is a number of the keywords identified in the interviewee's resume.

Other types of algorithms for generating an accuracy parameter may, however, be used.

App server 205 determines a credibility parameter associated with the interviewee based on a length of the interviewee's responses to one or more questions, body gesture(s), facial expressions, eye contact and/or voice tone (block 1015). App server 205 may perform an audio analysis of the interviewee's responses to identify a length of the interviewee's verbal response to each interview question, and a tone (e.g., excited, even, strained, relaxed, etc.) associated with the interviewee's voice. App server 205 may additionally perform an image analysis of the video to identify and classify the interviewee's body gestures, facial expressions, and type of eye contact (e.g., looking right at the camera, eyes wandering, etc.). App server 205 may use various different algorithms to generate a credibility parameter based on the audio and image analysis. For example, a higher score for the credibility parameter indicates a higher level of interviewee credibility, and a lower score for the credibility parameter indicates a lower level of interviewee credibility.

App server 205 determines a trueness parameter, indicative of false information, based on missing or false information from the interviewee's resume and/or responses (block 1020). App server 205 may analyze the interviewee's resume, and the text of the interviewee's responses to interview questions, and compare the two to identify false information or missing information. App server 205 may also analyze the interviewee's resume, and the text of the interviewee's responses to interview questions, and compare to other information app server 205 may have obtained to verify the content of the interviewee's resume and/or responses. For example, app server 205 may search publicly available information about the interviewee to verify information provided via the resume or the interview responses. Any number of different algorithms may be used to generate a score for the trueness parameter based on the identification of missing or false information the interviewee's resume and/or interview responses.

App server 205 receives the interviewer's manually entered evaluation score(s) and comments for the interviewee (block 1025). Block 1025 may be an optional block in the process of FIG. 10 to enable the interviewer, or other human resources-type individual responsible for evaluating interviewees, input into the interviewee evaluation process. App server 205 determines an interviewee evaluation score based on the accuracy, credibility, and trueness parameters and/or based on the interviewer's evaluation score(s) and comments (block 1030). Any number of different algorithms may be used to determine an interviewee evaluation score based on the accuracy, credibility and/or trueness parameters and/or based on the interviewer's manually entered evaluation score(s). For example, in a simple implementation, the accuracy, credibility, and trueness parameters may be multiplied by one another, and then multiplied by the interviewer's evaluation score, which is also multiplied by a weighting factor. The weighting factor may give more, or less, weight to the interviewer's evaluation score relative to the combination of the accuracy, credibility and trueness parameters generated by app server 205. The determined interviewee evaluation score may serve as a basis for extending an offer of employment in an organization, or an offer of a position in the organization. For example, the determined interviewee evaluation scores of a group of interviewees of a virtual interview may be compared against one another to determine one or more of the interviewees that may be offered the position in the organization.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A, 5B, 7A, 7B, 7C, 9 and 10, the order of the blocks may be varied in other implementations. Moreover, non-dependent blocks may be performed in parallel. Embodiments have been described herein as creating and/or conducting a virtual interview for interviewing candidates for a job or a position. In other embodiments, the virtual interviews may be used for interviewing candidates for other reasons, such as for financial loans, proposed business partnerships, selecting individuals to who to sell items or assets, etc. In other implementations, virtual interview app 110 may also include a human resources (HR) plug-in that includes pre or post virtual interview processes, such as, for example, head-count budgeting processes and requirements, candidate documentation and/or reference checking, workflow approval processes, immigration requirements checking, non-disclosure agreements, etc. In further implementations, all voice input associated with interview questions and/or interview responses may be converted from voice to text, and all text input (e.g., resumes, references, etc.) may be converted from text to voice. Embodiments have been described herein with virtual interview app 110 implementing a graphical user interface at device 105 or device 130 (e.g., FIGS. 6, 8A and 8B). However, other types of user interfaces (e.g., a textual interface) may alternatively be used.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A network device, comprising:
    a communication interface configured to:
        receive multiple first media clips that include multiple first interview questions associated with a first virtual interview; and
    a processing unit configured to:
        store the multiple first media clips;
        cause first notifications of the first virtual interview to be sent from the network device via the communication interface to a first mobile device associated with a first interviewee;
        conduct, between the network device and the first mobile device via the communication interface, the first virtual interview based on the first interviewee's interaction with the multiple first media clips to create multiple second media clips that include the first interviewee's responses to the multiple first interview questions;
        analyze, using one or more of a speech recognition technique or an image analysis technique, content of the multiple second media clips associated with the first interviewee's responses to the multiple first interview questions to determine one or more parameters associated with the accuracy or trueness of the first interviewee's responses, or with the credibility of the first interviewee, and
        generate a first interview evaluation score for the first interviewee based on the determined one or more parameters, wherein the first interview evaluation score serves as a basis for extending an offer of employment in an organization, or an offer of a position in the organization, to the first interviewee.

2. The network device of claim 1, wherein, when conducting the first virtual interview, the processing unit is configured to:
    send, via the communication interface, the multiple first media clips to the first mobile device; and
    receive, via the communication interface, the multiple second media clips from the first interviewee that include the first interviewee's responses to the multiple first interview questions.

3. The network device of claim 1, wherein, when analyzing the content of the multiple second media clips, the processing unit is further configured to:
    convert, using the speech recognition technique, voice content of the first interviewee contained in the multiple second media clips to first text,
    analyze the first text to identify inaccuracies in the first interviewee's responses, and
    generate an accuracy parameter, of the one or more parameters, based on the identified inaccuracies.

4. The network device of claim 1, wherein, when analyzing the content of the multiple second media clips, the processing unit is further configured to:
    analyze, using the image analysis technique, one or more of body gestures, facial expressions, eye movement or direction, or a voice quality of the first interviewee contained in images or video included in the multiple second media clips to generate a credibility parameter, of the one or more parameters, associated with the first interviewee.

5. The network device of claim 1, wherein, when analyzing the content of the multiple second media clips, the processing unit is further configured to:
    convert, using the speech recognition technique, voice content of the first interviewee contained in the multiple second media clips to first text,
    analyze the first text to identify false, misleading, or missing information in the first interviewee's responses, and
    generate a trueness parameter, of the one or more parameters, based on the identified false, misleading, or missing information.

6. The network device of claim 1, wherein, when analyzing the content of the multiple second media clips, the processing unit is further configured to:
    convert, using the speech recognition technique, voice content of the first interviewee contained in the multiple second media clips to first text,
    analyze the first text to identify inaccuracies in the first interviewee's responses,
    analyze the first text to identify false, misleading, or missing information in the first interviewee's responses,
    analyze, using the image analysis technique, one or more of body gestures, facial expressions, eye movement or direction, or a voice quality of the first interviewee contained in images or video included in the multiple second media clips to generate a credibility parameter, of the one or more parameters, associated with the first interviewee,
    generate an accuracy parameter, of the one or more parameters, based on the identified inaccuracies, and
    generate a trueness parameter, of the one or more parameters, based on the identified false, misleading, or missing information.

7. A method, comprising:
    receiving, at a network device, multiple first media clips that include multiple first interview questions associated with a first virtual interview;
    storing, in a database in association with the network device, the multiple first media clips;
    conducting, between the network device and a first mobile device associated with a first interviewee, the first virtual interview based on the first interviewee's interaction with the multiple first media clips to create multiple second media clips that include the first interviewee's responses to the multiple first interview questions;
    analyzing, by the network device using one or more of a speech recognition technique or an image analysis technique, content of the multiple second media clips associated with the first interviewee's responses to the multiple first interview questions to determine one or more parameters associated with the accuracy or trueness of the first interviewee's responses, or with the credibility of the first interviewee, and generating a first interview evaluation score for the first interviewee based on the determined one or more parameters, wherein the first interview evaluation score serves as a basis for extending an offer of employment in an organization, or an offer of a position in the organization, to the first interviewee.

8. The method of claim 7, wherein conducting the first virtual interview comprises:
sending, from the network device, the multiple first media clips to the first mobile device; and
receiving, at the network device, the multiple second media clips from the first interviewee at the first mobile device.

9. The method of claim 7, wherein analyzing the content of the multiple second media clips comprises:
converting, using the speech recognition technique, voice content of the first interviewee contained in the multiple second media clips to first text;
analyzing the first text to identify inaccuracies in the first interviewee's responses; and
generating an accuracy parameter, of the one or more parameters, based on the identified inaccuracies.

10. The method of claim 7, wherein analyzing the content of the multiple second media clips comprises:
analyzing, using the image analysis technique, one or more of body gestures, facial expressions, eye movement or direction, or a voice quality of the first interviewee contained in images or video included in the multiple second media clips to generate a credibility parameter, of the one or more parameters, associated with the first interviewee.

11. The method of claim 7, wherein analyzing the content of the multiple second media clips comprises:
converting, using the speech recognition technique, voice content of the first interviewee contained in the multiple second media clips to first text;
analyzing the first text to identify false, misleading, or missing information in the first interviewee's responses; and
generating a trueness parameter, of the one or more parameters, based on the identified false, misleading, or missing information.

12. The method of claim 7, wherein analyzing the content of the multiple second media clips comprises:
converting, using the speech recognition technique, voice content of the first interviewee contained in the multiple second media clips to first text;
analyzing the first text to identify inaccuracies in the first interviewee's responses;
analyzing the first text to identify false, misleading, or missing information in the first interviewee's responses;
analyzing, using the image analysis technique, one or more of body gestures, facial expressions, eye movement or direction, or a voice quality of the first interviewee contained in images or video included in the multiple second media clips to generate a credibility parameter, of the one or more parameters, associated with the first interviewee;
generating an accuracy parameter, of the one or more parameters, based on the identified inaccuracies, and
generating a trueness parameter, of the one or more parameters, based on the identified false, misleading, or missing information.

13. The method of claim 7, further comprising:
conducting, between the network device and a second mobile device associated with a second interviewee, the first virtual interview based on the second interviewee's interaction with the multiple first media clips to create multiple third media clips that include the second interviewee's responses to the multiple first interview questions;
analyzing, by the network device using one or more of a speech recognition technique or an image analysis technique, content of the multiple third media clips associated with the second interviewee's responses to the multiple first interview questions to determine one or more parameters associated with the accuracy or trueness of the second interviewee's responses, or with the credibility of the second interviewee, and
generating a second interview evaluation score for the second interviewee based on the determined one or more parameters, wherein the second interview evaluation score serves as a basis for extending an offer of employment in the organization, or an offer of a position in the organization, to the second interviewee.

14. The method of claim 7, further comprising:
receiving, at the network device, multiple third media clips associated with multiple second interview questions for a second virtual interview;
storing, in the database in association with the network device, the multiple third media clips;
conducting, between the network device and a second mobile device associated with a second interviewee, the second virtual interview based on the second interviewee's interaction with the multiple third media clips to create multiple fourth media clips that include the second interviewee's responses to the multiple second interview questions;
analyzing, by the network device using one or more of a speech recognition technique or an image analysis technique, content of the multiple fourth media clips associated with the second interviewee's responses to the multiple second interview questions to determine one or more second parameters associated with the accuracy or trueness of the second interviewee's responses, or with the credibility of the second interviewee, and
generating a second interview evaluation score for the second interviewee based on the determined one or more second parameters, wherein the second interview evaluation score serves as a basis for extending an offer of employment in an organization, or an offer of a position in the organization, to the second interviewee.

15. A non-transitory computer-readable medium containing instructions executable by at least one processor of a network device, the computer-readable medium comprising instructions to:
receive multiple first media clips that include multiple first interview questions associated with a first virtual interview;
store, in memory, the multiple first media clips;
conduct, between the network device and a first mobile device associated with a first interviewee, the first virtual interview based on the first interviewee's interaction with the multiple first media clips to create multiple second media clips that include the first interviewee's responses to the multiple first interview questions;
analyze, using one or more of a speech recognition technique or an image analysis technique, content of the multiple second media clips associated with the first interviewee's responses to the multiple first interview questions to determine one or more parameters associated with the accuracy or trueness of the first interviewee's responses, or with the credibility of the first interviewee, and generate a first interview evaluation score for the first interviewee based on the determined one or more parameters, wherein the first interview evaluation score serves as a basis for extending an offer of employment in an organization, or an offer of a position in the organization, to the first interviewee.

16. The non-transitory computer-readable medium of claim 15, wherein the instructions for conducting the first virtual interview further comprise instructions to:
cause the multiple first media clips to be sent from the network device to the first mobile device; and
receive the multiple second media clips, from the first interviewee at the first mobile device, that include the first interviewee's responses to the multiple first interview questions.

17. The non-transitory computer-readable medium of claim 15, wherein the instructions for analyzing the content of the multiple second media clips comprise instructions to:
convert, using the speech recognition technique, voice content of the first interviewee contained in the multiple second media clips to first text;
analyze the first text to identify inaccuracies in the first interviewee's responses; and
generate an accuracy parameter, of the one or more parameters, based on the identified inaccuracies.

18. The non-transitory computer-readable medium of claim 15, wherein the instructions for analyzing the content of the multiple second media clips comprise instructions to:
analyze, using the image analysis technique, one or more of body gestures, facial expressions, eye movement or direction, or a voice quality of the first interviewee contained in images or video included in the multiple second media clips to generate a credibility parameter, of the one or more parameters, associated with the first interviewee.

19. The non-transitory computer-readable medium of claim 15, wherein the instructions for analyzing the content of the multiple second media clips comprise instructions to:
convert, using the speech recognition technique, voice content of the first interviewee contained in the multiple second media clips to first text;
analyze the first text to identify false, misleading, or missing information in the first interviewee's responses; and
generate a trueness parameter, of the one or more parameters, based on the identified false, misleading, or missing information.

20. The non-transitory computer-readable medium of claim 15, wherein the instructions for analyzing the content of the multiple second media clips comprise instructions to:
convert, using the speech recognition technique, voice content of the first interviewee contained in the multiple second media clips to first text;
analyze the first text to identify inaccuracies in the first interviewee's responses;
analyze the first text to identify false, misleading, or missing information in the first interviewee's responses;
analyze, using the image analysis technique, one or more of body gestures, facial expressions, eye movement or direction, or a voice quality of the first interviewee contained in images or video included in the multiple second media clips to generate a credibility parameter, of the one or more parameters, associated with the first interviewee;
generate an accuracy parameter, of the one or more parameters, based on the identified inaccuracies, and
generate a trueness parameter, of the one or more parameters, based on the identified false, misleading, or missing information.

* * * * *